July 21, 1964
E. L. CAMPBELL
3,141,178
ADJUSTABLE BED FOR TRUCKERS
Filed Dec. 21, 1962
3 Sheets-Sheet 1
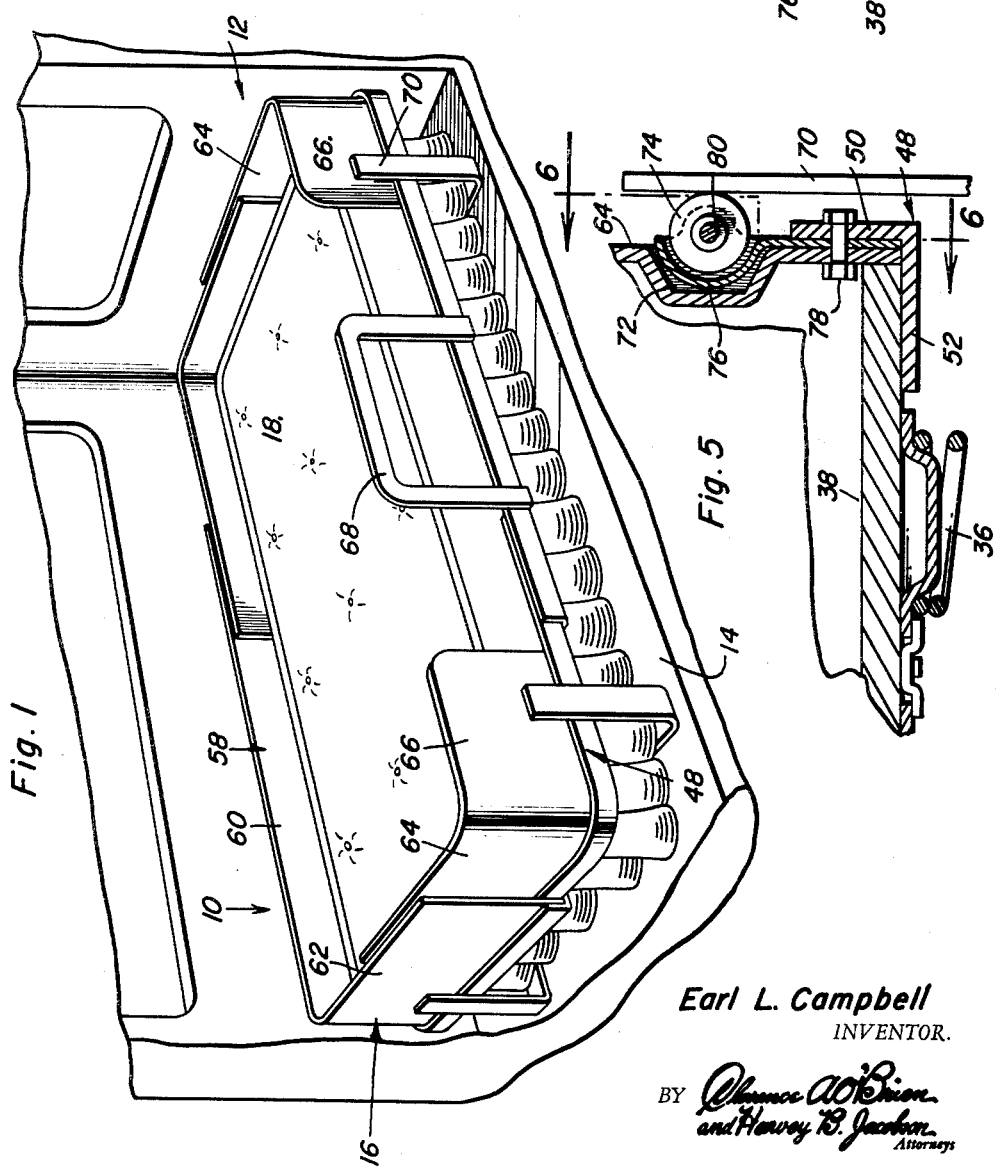
Earl L. Campbell
INVENTOR.
BY July 21, 1964   E. L. CAMPBELL   3,141,178
ADJUSTABLE BED FOR TRUCKERS
Filed Dec. 21, 1962   3 Sheets-Sheet 2
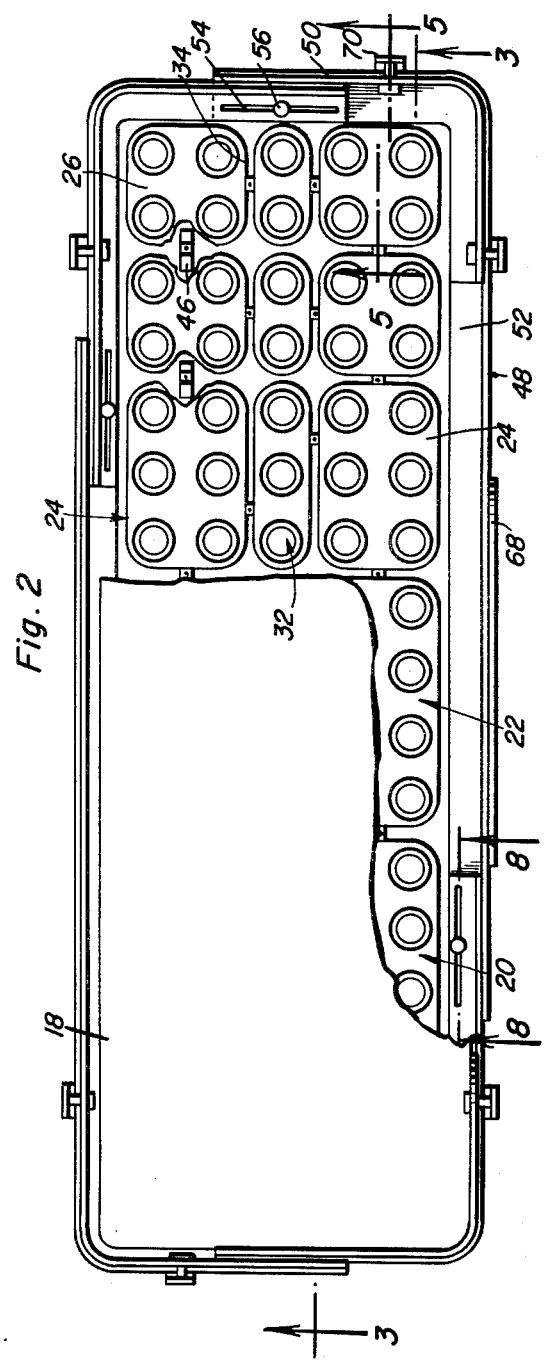
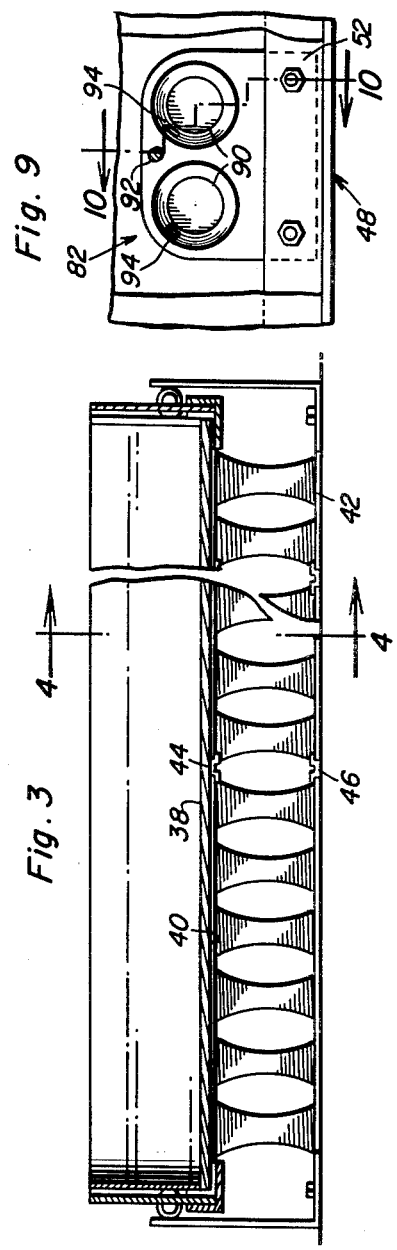
Earl L. Campbell
INVENTOR.

July 21, 1964
E. L. CAMPBELL
3,141,178
ADJUSTABLE BED FOR TRUCKERS
Filed Dec. 21, 1962
3 Sheets-Sheet 3
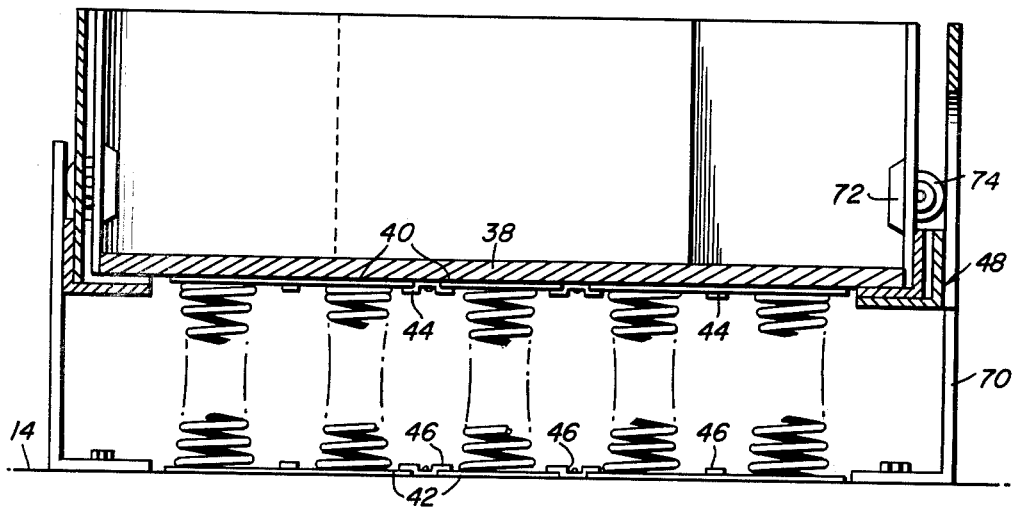
Fig. 4
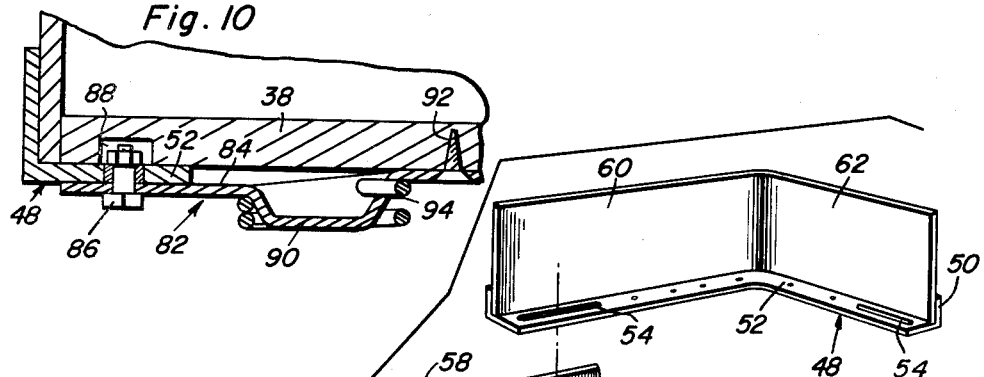
Fig. 10
Fig. 7
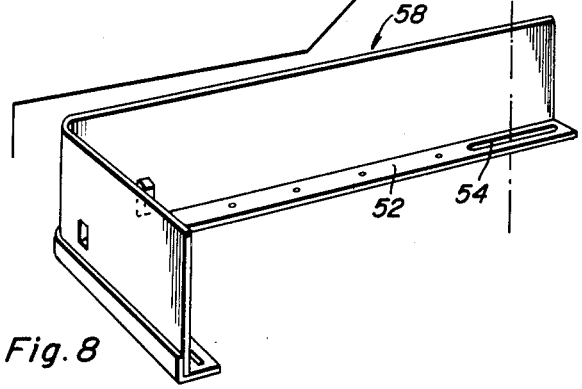
Fig. 8
Earl L. Campbell
INVENTOR.
BY *Clarence A. O'Brien*
*and Harvey B. Jackson*
Attorneys

United States Patent Office 3,141,178
Patented July 21, 1964

3,141,178
ADJUSTABLE BED FOR TRUCKERS
Earl L. Campbell, 9601 Constitution NE.,
Albuquerque, N. Mex.
Filed Dec. 21, 1962, Ser. No. 246,632
9 Claims. (Cl. 5—118)

This invention relates to a bed construction particularly useful for installation in moving vehicles.

A primary object of the present invention therefore, is to provide a bed construction capable of absorbing and reducing shock and vibration transmitted that occurs in response to vehicle movement so as to provide a more comfortable resting place within the vehicle.

The bed construction of the present invention therefore meets the problem presented to long line truck drivers who must sleep or rest a considerable period of time during which the vehicle is moving. Substantial reduction in the continuous vibration present in the vehicle during movement and absorption of intermittent severe road shock, by the bed construction of the present invention therefore represents a noteworthy achievement and contribution.

In accordance with the foregoing objects, another object of the present invention is to provide a bed supporting construction designed to dampen the usual fatigue producing vertical displacement of the bed frame and also the less frequent severe shock tending to cause displacement in a horizontal plane such as occurs because of abrupt stops and starts and sudden turns of the vehicle without impairment of the vertical shock absorbing facilities.

A still further object of the present invention in accordance with the foregoing objects is to provide a bed frame construction which is adjustable in accordance with varying dimensional and load-sustaining requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the adjustable bed construction of the present invention installed in a typical vehicular environment.

FIGURE 2 is a top plan view of the bed construction with parts broken away.

FIGURE 3 is a sectional view taken substantially through a plane indicated by the section line 3—3 in FIGURE 2.

FIGURE 4 is a sectional view taken substantially through a plane indicated by the section line 4—4 in FIGURE 3.

FIGURE 5 is an enlarged partial sectional view taken substantially through a plane indicated by the section line 5—5 in FIGURE 2.

FIGURE 6 is a partial sectional view taken substantially through a plane indicated by the section line 6—6 in FIGURE 5.

FIGURE 7 is a perspective view of interconnected frame parts shown disassembled.

FIGURE 8 is a partial sectional view taken substantially through a plane indicated by the section line 8—8 in FIGURE 2.

FIGURE 9 is a partial top plan view of a modified portion of bed construction.

FIGURE 10 is a partial sectional view taken substantially through a plane indicated by the section line 10—10 in FIGURE 9.

Referring now to the drawings in detail, it will be observed from FIGURE 1 that the bed construction generally referred to by reference numeral 10 is located and operatively mounted within a sleeping compartment 12 of a vehicle. Accordingly, the vehicle compartment 12 is provided with a supporting floor 14 above which the bed construction is mounted.

As more clearly seen from FIGURES 1, 2, 3 and 4, the bed construction includes a peripheral frame assembly generally referred to by reference numeral 16 which is adjustable so as to form a rectangular configuration of variable width and length within which a mattress 18 may be received. The peripheral frame assembly 16 is mounted in spaced relation above the floor 14 by a requisite number of spring pod assemblies including pod assemblies 20, 22, 24, 26, 28, 30, 32 and 34 to dampen the usual fatigue producing vertical displacement that occurs during vehicle movement. Each of these pod assemblies includes different numbers of coil springs 36. In this manner, spring pod assemblies of different sizes may be selectively removed or added for attachment to a rectangular surface supporting member 38 in accordance with the size of the supporting member 38 and the load to be supported thereon. The coil springs 36 have opposite axial ends thereof of enlarged diameter as compared to the intermediate portions, the axial ends being respectively secured to anchoring plate members 40 and 42 as more clearly seen in FIGURE 4 whereby each of the pod assemblies may be removably clamped to the bottom of the supporting member 38 and the floor 14. A plurality of clamp elements 44 and 46 may therefore be provided on the supporting member 38 and floor 14 respectively for such purpose. The supporting member 38 will thereby be floatingly supported by the spring pod assemblies in spaced relation above the floor 14 providing the usual shock-absorbing support for the mattress 18 with respect to vertical displacement or vibration. The supporting surface member 38 is therefore secured to the peripheral frame assembly 16 within which the mattress 18 is received.

The peripheral frame assembly 16 includes four angle frame members 48 which have a ninety degree bend so as to form one corner of the frame assembly 16. Each of the angle frame members is therefore provided with a vertical leg portion 50 and an inwardly projecting horizontal leg portion 52. An elongated slot 54 is formed within the horizontal leg portion 52 adjacent to but spaced from each end of the frame member 48 for cooperation with a releasable fastener assembly 56 as more clearly seen in FIGURE 8 which extends through the slots 54 of adjacent overlapping angle frame members 48 as more clearly seen in FIGURE 7. In this manner, the rectangular configuration formed by the frame members 48, may be adjusted both in length and width in accordance with dimensional requirements. Also secured to two of the angle frame members 48, are vertically upstanding rail members 58 including a back rail portion 60 and a side rail portion 62. The back rail portions 60 overlap while the side rail portions 62 disposed at opposite longitudinal ends of the bed construction, overlap the side rail portions 64 connected to wrap around portions 66 longitudinally spaced from each other so as to provide access to the bed. A guard rail 68 may also be secured to one of the front angle frame members of the frame assembly 16 as more clearly seen in FIGURE 1. It will therefore be apparent, that the mattress will be held within the frame assembly on the supporting member 36 and the rail members of the frame assembly will provide protection for the limbs of a person reclining or resting on the mattress.

A plurality of rigid guide members 70 are mounted on the floor 14 in close spaced relation to the peripheral frame assembly 16. Accordingly, a single guide member 70 is associated with each of the narrower side portions of the frame assembly while a pair of such guide members 70 are associated with the longer side portions of the frame assembly. It will therefore be apparent, that the guide members are disposed in planes perpendicular to each other so as to be effective to resist horizontal displacement of the bed frame in any direction. As more clearly seen in FIGURES 5 and 6, each of the vertical rail members of the frame assembly is provided with a recess 72 aligned with one of the rigid guide members 70 so as to present for engagement therewith, a single roller element 74. Bracket members 76 are therefore secured to the frame assembly by fastener assemblies 78 which extend through the vertical leg portions 50 and the rail members connected thereto. Each bracket member 76 includes a portion which projects from the recess 72 for rotatably mounting one roller 74 on a pin 80. The rollers 74 therefore engage the rigid guide members 70 with substantially line contact to define a plane parallel to the supporting member 38 and are made of shock-absorbing material so as to resist horizontal displacement of the frame assembly parallel to said plane. The pins 80 accordingly establish horizontal axes for the rollers 74 with respect to which the rollers may rotate so as to accommodate vertical displacement of the frame assembly in a direction perpendicular to said plane while resisting horizontal displacement thereof. Also, since the guide members 70 and associated rollers are disposed perpendicular to each other, said horizontal displacement will be resisted in all directions. In this manner, the sudden shock resulting from abrupt stopping, starting or turning, which ordinarily produce horizontal displacement, will be absorbed by the rollers 74 which otherwise do not influence displacement of the supporting member 38 under static load. The spring pod assemblies may therefore be restrictively designed to take care of the vertical displacement and vibration since horizontal distortion is substantially eliminated.

Referring now to FIGURES 9 and 10, a modified form of pod assembly is illustrated. The pod assembly referred to by reference numeral 82 include a plate member 84 secured by a pair of fastener assemblies 86 to the underside of the horizontal leg portion 52 of the angle frame member 48. The undersurface of the supporting surface member 38 may therefore be provided with recesses 88 to accommodate the fastener assembly 86. The plate member 84 is provided with a pair of projecting bosses 90 adapted to anchor the large diameter ends of coil springs similar in shape to the coil springs 36 hereinbefore described. The portion of the plate member 84 remote from the frame member 48, is secured to the underside of the supporting member 38 by the screw fastener 92. The coil springs may therefore be anchored to the underside of the supporting member 38, each of the bosses 90 being provided with a locking aperture 94 for such purpose. It will therefore be apparent, that the spring pod assembly 82 differs from those hereinbefore described by being secured to the angle frame members 48 directly, this form of pod assembly 82 capable of being placed about the frame assembly as needed replacing the pod assemblies hereinbefore described.

From the foregoing description, the construction, purpose and utility of the bed construction of the present invention will be apparent. It will therefore be appreciated, that the bed construction is particularly suited for vehicular installation because of its ability to both absorb continuous vibration in a vertical direction and resist horizontal displacement so as to absorb the less frequent yet severe shocks that occur during movement of a vehicle. Also, the adjustability features of the bed construction including facilities for dimensionally adjusting the peripheral frame assembly and for removal or addition of spring pod assemblies, makes the bed construction adaptable for vehicles having different spatial accommodations for the bed construction. The pod assemblies being of different sizes, may be selectively removed or added for this purpose. Such tailoring of the bed support for any particular vertical load requirement is made possible because no transfer of the vertical load to the guide members 70 occurs at any time to relieve or alter the load sustained by any of the pod assemblies which would thereby disturb the yieldable supporting relationships of the pod assemblies. In connection with the pod assemblies 82 described with respect to FIGURES 9 and 10, it will be appreciated that removal and replacement of the coil springs is facilitated by use of the locking apertures 94 whereby a coil spring may be twisted for removal or insertion. Coil springs of different tension may therefore be selectively installed in connection with the pod assemblies 82 for the purpose of accommodating different loading requirements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a bed construction for a moving vehicle or the like, a supporting frame assembly mounted on the floor of the vehicle comprising, peripheral frame means, supporting surface means connected to said peripheral frame means, a plurality of spring pod assemblies resting on the floor and connected to said supporting surface means for sole support thereof above the floor, rigid guide means mounted on the floor in close spaced relation to the peripheral frame means, and yieldable means operatively mounted on said peripheral frame means and engageable with said guide means in substantially a single plane for resisting horizontal displacement of the supporting surface means.

2. The combination of claim 1, wherein each of said spring pod assemblies includes a pair of anchoring plates adapted to be removably clamped to the supporting surface means and the floor and a plurality of coil springs yieldably spacing said anchoring plates, said spring pod assemblies having different numbers of coil springs to enable a selected change in the number of spring pod assemblies to accommodate changes in size of and load on the supporting surface means.

3. In a bed construction for a moving vehicle or the like, a supporting frame assembly mounted on the floor of the vehicle comprising, peripheral frame means, supporting surface means connected to said peripheral frame means, a plurality of spring pod assemblies connected to said supporting surface means for floating support thereof above the floor of the vehicle, rigid guide means mounted on the floor in close spaced relation to the frame means, and yieldable means operatively mounted on said peripheral frame means and engageable with said guide means for resisting horizontal displacement of the supporting surface means, each of said spring pod assemblies including a pair of anchoring plates adapted to be removably clamped to the supporting surface means and the floor, a plurality of coil springs yieldably spacing said anchoring plates, said spring pod assemblies having different number of coil springs to enable a selected change in the number of spring pod assemblies to accommodate changes in size of and load on the supporting surface means, said peripheral frame means comprising, a plurality of angle frame members adjustably connected to each other to form a rectangular configuration, and rail portions connected to said angle frame members extending upwardly therefrom and having a plurality of spaced recesses therein for mounting said yieldable means.

4. The combination of claim 3, wherein said yieldable means comprises a plurality of bracket members secured to the peripheral frame means and rollers mounted by said bracket members about horizontal axes perpendicular to each other and projecting outwardly from said frame means for engagement with said guide means, said rollers being made of yieldable shock-absorbing material.

5. The combination of claim 1, wherein said peripheral frame means comprises, a plurality of angle frame members adjustably connected to each other to form a rectangular configuration, and rail portions connected to said angle frame members extending upwardly therefrom and having a plurality of spaced recesses therein for mounting said yieldable means.

6. The combination of claim 5, wherein said yieldable means comprises a plurality of bracket members secured to the peripheral frame means and rollers mounted by said bracket members about horizontal axes perpendicular to each other and projecting outwardly from said frame means for engagement with said guide means, said rollers being made of yieldable shock-absorbing material.

7. The combination of claim 1, wherein said yieldable means comprises a plurality of bracket members secured to the peripheral frame means and rollers mounted by said bracket members about horizontal axes in said single plane and perpendicular to each other and projecting outwardly from said frame means for engagement with said guide means, said rollers being made of yieldable shock-absorbing material.

8. The combination of claim 1, wherein each of said pod assemblies includes, an anchoring plate secured to the peripheral frame means and at least two coil springs of different tension removably connected to the anchoring plate.

9. In a bed construction for a moving vehicle having a supporting floor, a supporting frame assembly adapted to support a vertical load thereon, and a plurality of replaceable spring units fixedly mounted on the supporting floor and connected to the frame assembly for sole support of said vertical load on the frame assembly in spaced relation above the supporting floor; guide means fixedly mounted on the floor in spaced relation to the frame assembly, shock absorbing means engageable with the guide means substantially in a single plane for yieldably resisting displacement along said plane, and means rotatably mounting said shock absorbing means on said frame assembly only about intersecting axes in said single plane to avoid any transfer of said vertical load to the guide means.

References Cited in the file of this patent
UNITED STATES PATENTS

| | | |
|---|---|---|
| 215,482 | Schapker | May 20, 1879 |
| 1,289,897 | Phillips | Dec. 31, 1918 |
| 3,028,606 | Boutet | Apr. 10, 1962 |
| 3,067,437 | Campbell | Dec. 11, 1962 |